United States Patent
Bartlett

(10) Patent No.: US 11,838,212 B2
(45) Date of Patent: Dec. 5, 2023

(54) METHOD AND SYSTEM FOR MANAGING, OPTIMIZING, AND ROUTING INTERNET TRAFFIC FROM A LOCAL AREA NETWORK (LAN) TO INTERNET BASED SERVERS

(71) Applicant: AAA Internet Publishing, Inc., West Kelowna (CA)

(72) Inventor: Robert Michael Norman Bartlett, West Kelowna (CA)

(73) Assignee: AAA INTERNET PUBLISHING INC., West Kelowna (CA)

( * ) Notice: Subject to any disclaimer, the term of this patent is extended or adjusted under 35 U.S.C. 154(b) by 0 days.

(21) Appl. No.: 17/328,095

(22) Filed: May 24, 2021

(65) Prior Publication Data
US 2021/0281518 A1    Sep. 9, 2021

Related U.S. Application Data

(63) Continuation-in-part of application No. 14/047,678, filed on Oct. 7, 2013, now Pat. No. 11,050,669.
(Continued)

(51) Int. Cl.
*H04L 47/10* (2022.01)
*H04L 47/2483* (2022.01)
(Continued)

(52) U.S. Cl.
CPC ......... *H04L 47/13* (2013.01); *H04L 47/2441* (2013.01); *H04L 47/2483* (2013.01); *H04L 67/131* (2022.05)

(58) Field of Classification Search
CPC . H04L 47/13; H04L 47/2441; H04L 47/2483; H04L 67/38; H04L 45/306; H04L 67/2814; H04L 45/302; H04L 45/04
(Continued)

(56) References Cited

U.S. PATENT DOCUMENTS

| 5,351,239 A | 9/1994 | Black et al. |
| 6,215,789 B1 | 4/2001 | Keenan et al. |

(Continued)

FOREIGN PATENT DOCUMENTS

| WO | 2009/084967 A1 | 7/2009 | |
| WO | WO2009084967 | * 7/2009 | ......... H04L 12/2602 |

OTHER PUBLICATIONS

Non-Final Office Action issued in U.S. Appl. No. 15/825,849, dated Aug. 20, 2019.
(Continued)

*Primary Examiner* — Meng Vang
(74) *Attorney, Agent, or Firm* — Michele V. Frank; Venable LLP

(57) ABSTRACT

A method for optimizing internet traffic from a plurality of local area networks (LANs) to an internet based server connected to internet includes instructions for analyzing an internet data by a gateway computer located in a first LAN of the plurality of LANs to determine a data that is latency sensitive and a data that is not latency sensitive; instructions for sending network steering data, by the gateway computer, to a Central Processing Matrix (CPM); instructions for sending data, by a plurality of customer premises equipment (CPE) located in a second plurality of LANs in the plurality of LANs to the CPM through a listener/reporter located outside of the plurality of LANs; instructions for receiving the network steering data by the listener/reporter from the CPM; and instructions for routing the data that is latency sensitive outside of the second plurality of LANs to the internet based server.

41 Claims, 10 Drawing Sheets

Related U.S. Application Data

(60) Provisional application No. 61/710,026, filed on Oct. 5, 2012.

(51) Int. Cl.
*H04L 47/2441* (2022.01)
*H04L 67/131* (2022.01)

(58) Field of Classification Search
USPC .......................................................... 709/238
See application file for complete search history.

(56) References Cited

U.S. PATENT DOCUMENTS

| | | | |
|---|---|---|---|
| 6,707,915 | B1 | 3/2004 | Jobst et al. |
| 6,845,453 | B2 | 1/2005 | Scheidt et al. |
| 6,973,037 | B1 | 12/2005 | Kahveci |
| 7,159,234 | B1 | 1/2007 | Murphy et al. |
| 7,609,671 | B1 | 10/2009 | Nuriyev et al. |
| 7,633,869 | B1 | 12/2009 | Morris |
| 7,673,056 | B1 | 3/2010 | Inbaraj et al. |
| 7,711,846 | B2 | 5/2010 | Padmanabhan et al. |
| 7,730,157 | B2 | 6/2010 | Baratto et al. |
| 7,925,281 | B2 | 4/2011 | Cahn |
| 7,937,336 | B1 | 5/2011 | Maynard-Zhang et al. |
| 7,983,148 | B1 | 7/2011 | Abramson et al. |
| 8,131,834 | B1 | 3/2012 | Augart |
| 8,239,510 | B2 | 8/2012 | Houri |
| 8,589,536 | B2 | 11/2013 | Karenos et al. |
| 8,683,609 | B2 | 3/2014 | Bravo et al. |
| 8,739,269 | B2 | 5/2014 | Dargis |
| 8,788,664 | B2 | 7/2014 | Guo et al. |
| 9,026,145 | B1 | 5/2015 | Duleba et al. |
| 9,087,183 | B2 | 7/2015 | Bartlett |
| 9,160,711 | B1 | 10/2015 | Sweet |
| 9,571,359 | B2 | 2/2017 | Bartlett |
| 9,614,870 | B2 | 4/2017 | Bartlett et al. |
| 9,729,504 | B2 | 8/2017 | Bartlett |
| 9,742,646 | B2 | 8/2017 | Bartlett |
| 9,985,985 | B2 | 5/2018 | Bartlett et al. |
| 10,525,343 | B2 | 1/2020 | Bartlett et al. |
| 10,917,299 | B2 | 2/2021 | Bartlett et al. |
| 11,050,669 | B2 | 6/2021 | Bartlett |
| 11,606,253 | B2 | 3/2023 | Bartlett et al. |
| 2001/0052008 | A1 | 12/2001 | Jacobus |
| 2002/0009079 | A1 | 1/2002 | Jungck et al. |
| 2002/0026321 | A1 | 2/2002 | Faris et al. |
| 2002/0145974 | A1 | 10/2002 | Saidi et al. |
| 2002/0147913 | A1 | 10/2002 | Lun Yip |
| 2003/0086425 | A1 | 5/2003 | Bearden et al. |
| 2003/0097442 | A1 | 5/2003 | Farhat et al. |
| 2003/0107990 | A1 | 6/2003 | Herschleb et al. |
| 2003/0128710 | A1 | 7/2003 | Fedyk et al. |
| 2004/0039847 | A1* | 2/2004 | Persson ............... H04L 12/4612 709/250 |
| 2004/0100953 | A1 | 5/2004 | Chen et al. |
| 2004/0148520 | A1 | 7/2004 | Talpade et al. |
| 2004/0172531 | A1 | 9/2004 | Little et al. |
| 2004/0187018 | A1 | 9/2004 | Owen et al. |
| 2004/0192256 | A1 | 9/2004 | Kuwajima |
| 2004/0221296 | A1 | 11/2004 | Ogielski et al. |
| 2005/0002335 | A1* | 1/2005 | Adamczyk ........ H04W 72/0446 370/230 |
| 2005/0015587 | A1 | 1/2005 | Stransky |
| 2005/0055708 | A1 | 3/2005 | Gould et al. |
| 2005/0108213 | A1 | 5/2005 | Riise et al. |
| 2005/0119996 | A1 | 6/2005 | Ohata et al. |
| 2005/0180416 | A1 | 8/2005 | Jayawardena et al. |
| 2005/0232193 | A1 | 10/2005 | Jorgensen |
| 2005/0234922 | A1 | 10/2005 | Parekh et al. |
| 2005/0270982 | A1 | 12/2005 | McBeath |
| 2006/0053021 | A1 | 3/2006 | Bystedt |
| 2006/0068799 | A1 | 3/2006 | Morton et al. |
| 2006/0130107 | A1 | 6/2006 | Gonder et al. |
| 2006/0153089 | A1 | 7/2006 | Silverman |
| 2006/0174160 | A1 | 8/2006 | Kim |
| 2006/0244818 | A1 | 11/2006 | Majors et al. |
| 2007/0016687 | A1 | 1/2007 | Agarwal et al. |
| 2007/0070914 | A1* | 3/2007 | Abigail ............... H04L 67/325 370/465 |
| 2007/0086338 | A1 | 4/2007 | Robert et al. |
| 2008/0037567 | A1* | 2/2008 | Cho .................... H04L 12/4625 370/401 |
| 2008/0056586 | A1 | 3/2008 | Cheng et al. |
| 2008/0092128 | A1 | 4/2008 | Corry et al. |
| 2008/0101368 | A1 | 5/2008 | Weinman |
| 2008/0125077 | A1 | 5/2008 | Velazquez et al. |
| 2008/0140817 | A1 | 6/2008 | Agarwal et al. |
| 2008/0144563 | A1 | 6/2008 | Hart |
| 2008/0279213 | A1 | 11/2008 | Tong et al. |
| 2008/0293494 | A1 | 11/2008 | Adiraju et al. |
| 2008/0313691 | A1* | 12/2008 | Cholas ............... H04L 12/2856 386/241 |
| 2009/0067328 | A1 | 3/2009 | Morris et al. |
| 2009/0193057 | A1* | 7/2009 | Maes .................. H04L 67/2838 |
| 2009/0203375 | A1 | 8/2009 | Gisby et al. |
| 2009/0262741 | A1 | 10/2009 | Jungck et al. |
| 2009/0280908 | A1 | 11/2009 | Carroll et al. |
| 2009/0282127 | A1 | 11/2009 | LeBlanc et al. |
| 2010/0036954 | A1 | 2/2010 | Sakata et al. |
| 2010/0046527 | A1 | 2/2010 | Li et al. |
| 2010/0125851 | A1 | 5/2010 | Singh et al. |
| 2010/0185961 | A1 | 7/2010 | Fisher et al. |
| 2010/0269044 | A1 | 10/2010 | Ivanyi et al. |
| 2010/0325309 | A1 | 12/2010 | Cicic et al. |
| 2011/0052008 | A1 | 3/2011 | Holsing et al. |
| 2011/0122812 | A1 | 5/2011 | Jeong et al. |
| 2011/0197132 | A1 | 8/2011 | Escoda et al. |
| 2011/0202656 | A1 | 8/2011 | Gentile et al. |
| 2011/0236665 | A1 | 9/2011 | Roque et al. |
| 2011/0246665 | A1 | 10/2011 | Vange et al. |
| 2011/0296303 | A1 | 12/2011 | Duquene et al. |
| 2012/0069748 | A1 | 3/2012 | Van Den Bogaert |
| 2012/0190444 | A1 | 7/2012 | Fujisawa et al. |
| 2012/0311107 | A1 | 12/2012 | Van der Merwe et al. |
| 2012/0314077 | A1 | 12/2012 | Clavenna, II et al. |
| 2013/0054763 | A1* | 2/2013 | Van der Merwe .... H04W 12/03 709/220 |
| 2013/0079144 | A1* | 3/2013 | Ahmed ................ A63F 13/87 463/42 |
| 2013/0097349 | A1 | 4/2013 | Lu et al. |
| 2013/0279354 | A1 | 10/2013 | Ekman et al. |
| 2013/0298220 | A1 | 11/2013 | Yoon et al. |
| 2014/0098662 | A1 | 4/2014 | Jungck et al. |
| 2014/0259109 | A1 | 9/2014 | Houston et al. |
| 2014/0344331 | A1 | 11/2014 | Johns et al. |
| 2015/0341312 | A1 | 11/2015 | Ezell et al. |
| 2015/0373135 | A1 | 12/2015 | McKeown et al. |
| 2021/0203546 | A1 | 7/2021 | Bartlett et al. |
| 2021/0281518 | A1 | 9/2021 | Bartlett et al. |

OTHER PUBLICATIONS

Final Office Action issued in U.S. Appl. No. 15/825,849, dated Feb. 18, 2020.
Advisory Action issued in U.S. Appl. No. 15/825,849, dated May 5, 2020.
Non-Final Office Action issued in U.S. Appl. No. 15/825,849, dated Jul. 6, 2019.
Final Office Action issued in U.S. Appl. No. 15/825,849, dated Apr. 13, 2021.
Advisory Action issued in U.S. Appl. No. 15/825,849, dated Sep. 3, 2021.
Non-Final Office Action issued in U.S. Appl. No. 15/825,849, dated Nov. 18, 2021.
P. Giura et al., "The security cost of content distribution network architectures." Computer Software and Applications Conference Workshops (COMPSACW), 2011. IEEE 35th Annual. IEEE, 2011 (pp. 128-135).
A.D. Keromytis et al., "SOS: An architecture for mitigating DDOS attacks." IEEE Journal on Selected Areas of Communications 22.1 (2004): 176-188.

(56) References Cited

OTHER PUBLICATIONS

W.G. Morein et al., "Using graphic Turing tests to counter automated DDOS attacks against web servers." Proceedings of the 10th ACM conference on computer and communications security. ACM, 2003. (pp. 8-19).
M.M. Aye, "A Queuing Analysis of Tolerating for Denial-of-Service (DOS) Attacks with a Proxy Network." Computer Engineering and Technology, 2009. ICCET'09. International Conference on vol. 2 IEEE, 2009. (pp. 366-368).
Kandula, S. et al., "What's Going On ?: Learning Communication Rules in Edge Networks," ACM SIGCOMM Computer Communication Review, vol. 38, No. 4. ACM, 2008. pp. 87-98.
Brinkmeier, M. et al., "Optimally DoS Resistant P2P Topologies for Live Multimedia Streaming," in IEEE Transactions on Parallel and Distributed Systems, vol. 20, No. 6, pp. 831-844, Jun. 2009.
Krishnan, R. et al., "A failure and overload tolerance mechanism for continuous media servers," Proceedings of the fifth ACM international conference on Multimedia. ACM, 1997. pp. 131-142.
Non-Final Office Action dated Oct. 5, 2018, directed to Re-Issue U.S. Appl. No. 15/604,182; 14 pages.
Final Office Action dated Dec. 12, 2018, directed to Re-Issue U.S. Appl. No. 15/604,182; 10 pages.
Notice of Allowance dated Mar. 12, 2019, directed to Re-Issue U.S. Appl. No. 15/604,182; 8 pages.
Non-Final Office Action dated Oct. 2, 2013, directed to U.S. Appl. No. 13/529,937; 16 pages.
Final Office Action dated Feb. 10, 2014, directed to U.S. Appl. No. 13/529,937; 16 pages.
Advisory Action dated Apr. 25, 2014, directed to U.S. Appl. No. 13/529,937; 4 pages.
Non-Final Office Action dated Nov. 28, 2014, directed to U.S. Appl. No. 13/529,937; 20 pages.
Notice of Allowance dated May 20, 2015, directed to U.S. Appl. No. 13/529,937; 13 pages.
Non-Final Office Action dated Jul. 28, 2017, directed to U.S. Appl. No. 15/439,677; 27 pages.
Notice of Allowance dated Jan. 29, 2018, directed to U.S. Appl. No. 15/439,677; 18 pages.
Notice of Allowance dated Feb. 22, 2018, directed to U.S. Appl. No. 15/439,677; 14 pages.
Non-Final Office Action dated Jul. 5, 2017, directed to U.S. Appl. No. 15/335,308; 14 pages.
Final Office Action dated Jan. 23, 2018, directed to U.S. Appl. No. 15/335,308; 15 pages.
Advisory Action dated Jun. 5, 2018, directed to U.S. Appl. No. 15/335,308; 4 pages.
Non-Final Office Action dated Jan. 4, 2019, directed to U.S. Appl. No. 15/335,308; 18 pages.
Final Office Action dated May 21, 2019, directed to U.S. Appl. No. 15/335,308; 17 pages.
Non-Final Office Action dated Sep. 20, 2019, directed to U.S. Appl. No. 15/335,308; 20 pages.
Final Office Action dated Mar. 20, 2020, directed to U.S. Appl. No. 15/335,308; 20 pages.
Notice of Allowance and Fee(s) Due dated Oct. 2, 2020, directed to U.S. Appl. No. 15/335,308; 20 pages.
Non-Final Office Action dated Sep. 8, 2017, directed to U.S. Appl. No. 15/335,304; 20 pages.
Final Office Action dated Mar. 21, 2018, directed to U.S. Appl. No. 15/335,304; 26 pages.
Advisory Action dated Jun. 25, 2018, directed to U.S. Appl. No. 15/335,304; 20 pages.
Non-Final Office Action dated Jan. 9, 2019, directed to U.S. Appl. No. 15/335,304; 29 pages.
Notice of Allowance and Fee(s) Due dated Aug. 14, 2019, directed to U.S. Appl. No. 15/335,304; 12 pages.
Notice of Allowance dated Jun. 9, 2017, directed to U.S. Appl. No. 15/399,303; 13 pages.
Non-Final Office Action dated Jan. 4, 2019, directed to U.S. Appl. No. 15/439,677; 18 pages.
Advisory Action dated Sep. 3, 2021, directed to U.S. Appl. No. 15/439,677; 6 pages.
Non-Final Office Action dated Jan. 6, 2022, directed to U.S. Appl. No. 17/141,944; 14 pages.
Final Office Action dated May 2, 2022, directed to U.S. Appl. No. 17/141,944; 7 pages.
Notice of Allowance dated Jun. 8, 2017, directed to U.S. Appl. No. 14/812,968; 10 pages.
Non-Final Rejection dated Jul. 15, 2016, directed to U.S. Appl. No. 14/731,286; 21 pages.
Notice of Allowance dated Nov. 18, 2016, directed to U.S. Appl. No. 14/731,286; 14 pages.
Notice of Allowance dated Sep. 16, 2022, directed to U.S. Appl. No. 15/825,849; 8 pages.
Non-Final Rejection dated Nov. 23, 2015, directed to U.S. Appl. No. 14/066,277; 12 pages.
Final Rejection dated Apr. 5, 2016, directed to U.S. Appl. No. 14/066,277; 11 pages.
Notice of Allowance dated Dec. 15, 2016, directed to U.S. Appl. No. 14/066,277; 17 pages.

* cited by examiner

METHOD AND SYSTEM FOR MANAGING, OPTIMIZING, AND ROUTING INTERNET TRAFFIC FROM A LOCAL AREA NETWORK (LAN) TO INTERNET BASED SERVERS

The present application is a Continuation-in-Part (CIP) application of U.S. patent application Ser. No. 14/047,678, filed on Oct. 7, 2013, which claims priority benefit to U.S. Provisional Patent Application No. 61/710,026, filed on Oct. 5, 2012, the entire contents of each of which are incorporated herein by reference.

FIELD OF INVENTION

The present invention relates generally to managing data transfer over a network. More specifically, the present invention is a method and system which identifies latency sensitive data and routes the latency sensitive data through a specific path that allows for minimum latency, hops, and packet loss.

BACKGROUND OF INVENTION

Like the real word traffics, the internet traffics become important and meanwhile overburdened by all kinds of data being transferred over the internet. Online activities such as gaming and streaming videos or audios have become extremely common forms of recreation in the modern life. Both streaming videos and playing computer or console games over the internet require fast network connections that are capable of transmitting data at high speeds. In some cases, one of the most important issues of data transfer over a network is the latency experienced by the data packets, when in transit. Latency is best understood as a time delay between when the data is sent and when the data is received. The effects of latency are most detrimental to gaming in which the data being transferred contains information about a player's actions. When latency is high, the time delay between when the player takes an action and when the game registers or carries out that action can be very detrimental to the player's gaming experience. High latency can make the game difficult, or even impossible to play with any success.

The latency issues in gaming are primarily caused when an internet service provider does not recognize that internet data being sent out from a game application is latency sensitive. As a result, the internet data sent out from the game application may not be treated properly and may be sent through the shaped ports that regulate or restrict the rate of internet data flowing through them. Additionally, the internet data may be sent through routers that are known chokepoints or experience a high rate of packet loss. All of these issues result in the players experiencing much more latency during their game playing or other activities. The root of the problem is what has been mentioned above. The fact that the internet service providers are incapable of recognizing and properly routing latency sensitive data such that minimal latency would be experienced by the player. This is primarily an issue in online gaming. However, there are other latency sensitive online activities, such as voice communication, that can suffer from the similar problems.

On the other hand, it has been noted that not all internet data are latency sensitive; some internet data are more dependent on bandwidth. Online activities such as downloading files and streaming videos are good examples of the activities that require high bandwidth, but do not necessarily suffer from latency issues. Unfortunately, online activities requiring high bandwidth can suffer from performance problems born from the same routing issues discussed above. If high bandwidth internet data is routed through a path which comprises routers and servers that are shaped or throttled, significant losses in data transmission rates can be observed. This can adversely affect the experience of a user; increasing video load times and increasing the time required to download files. Therefore, it is an objective of the present invention to overcome the routing issues causing the performance problems discussed above by creating a system and method by which internet data will be identified and routed more efficiently, thus providing significant performance boosts to the user of the present invention.

BRIEF DESCRIPTION OF THE DRAWINGS

FIG. 1 is a flow chart depicting the basic decisions carried out by the software when the internet data is processed and the resulting route the data may be forced through.

DETAILED DESCRIPTIONS OF THE INVENTION

All illustrations of the drawings and descriptions of embodiments are for the purpose of describing selected versions of the present invention and are not intended to limit the scope of the present invention.

The present invention is a method and system for managing, optimizing, and routing internet traffic from a local area network (LAN) to internet based servers, the destination servers. The present invention comprises a system and a method. The system of the present invention allows the method of the present invention to be effectively carried out to optimize routing of internet traffic and thereby increase internet performance especially with respect to latency sensitive activities such as gaming or voice communication. The present invention is also capable of improving the performance of bandwidth intensive activities such as downloading files. The system comprises software and a gamer private network or GPN for short.

Figure 1:
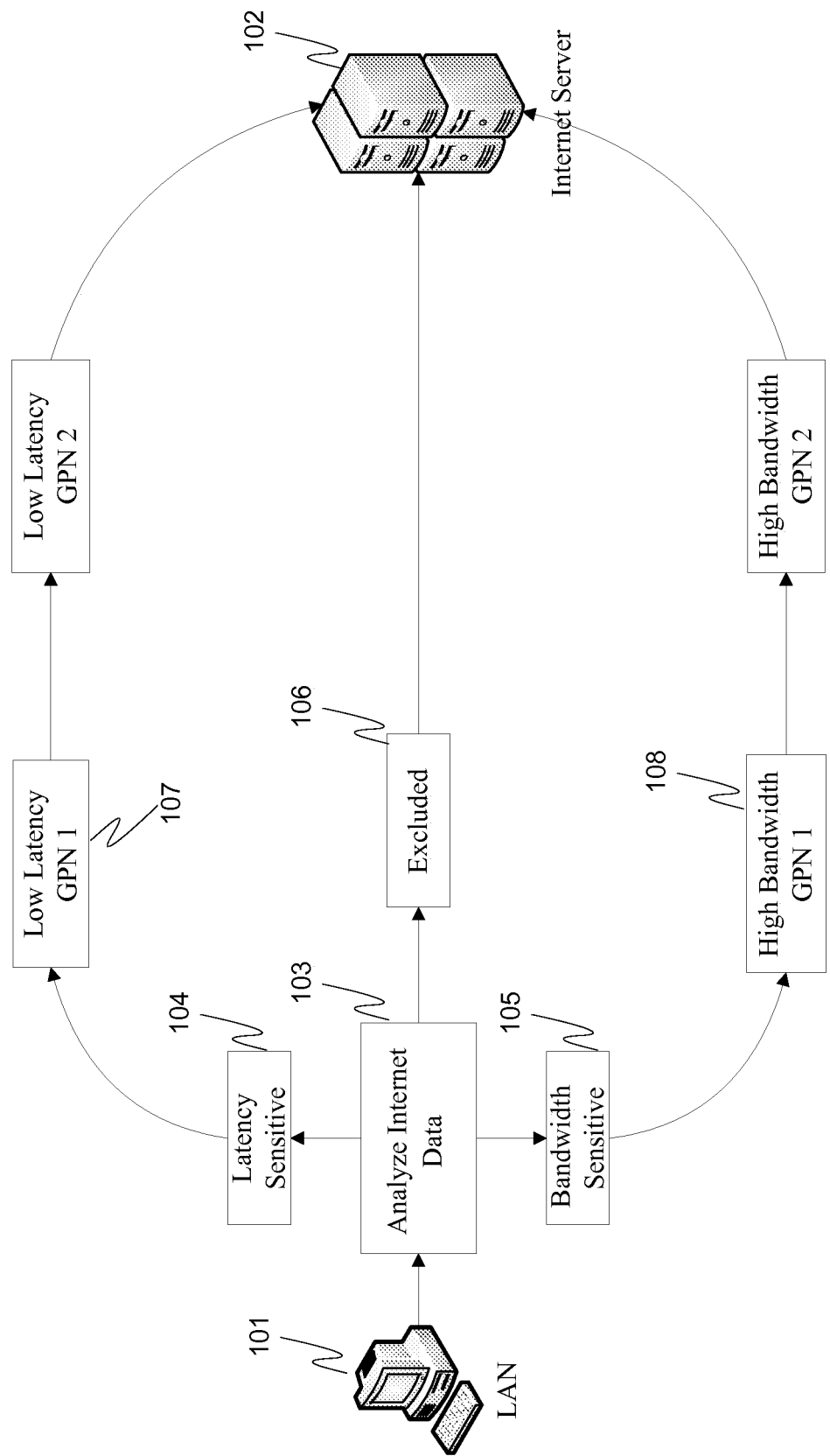

The software may be installed onto a user's computer and is responsible for analyzing all internet data 103 that is traveling out of the LAN 101, to the respective destination internet server 102. The software is also responsible for classifying the internet data as either latency sensitive category 104, bandwidth sensitive category 105, or not latency sensitive and not bandwidth sensitive category. Next, the latency sensitive and bandwidth sensitive data category are triaged to be sent out along the respective specific routes 107 and 108. The software is also able to determine if certain internet data should be excluded 106 from the rerouting normally done by the software. Normally, they are the data that are not latency sensitive and are not bandwidth sensitive, either. This process can be seen in FIG. 1, which displays a flowchart of the basic decision made by the software and the resulting route the internet data is forced to take.

In addition to the aforementioned gateway solution, a master-slave computer system can also be employed to provide a solution to the LAN. In this approach, a master computer is assigned on the LAN. Usually it is the same computer that is set as the gateway computer in the first approach. Other devices within the same LAN would be set as the slave computers or slave devices. A small application would be installed on the slaves to manage the traffic on the slave devices, controlled by the master computer. In many cases latency experienced on a LAN is due to mismanagement of available bandwidth on the LAN. Using the master-slave system would be an effective way to manage LAN bandwidth. The primary point is that the master computer has a larger management application installed, while the slave computer only needs a thin client installed. The master and slave communicate together, with the goal of providing better overall bandwidth management on the LAN. The thin clients help to better inform the master computer. Without this additional context from the thin clients, it is more likely that the master computer will mismanage the LAN traffic coming from LAN devices. This is similar in concept to LAN devices informing the CPM for routing decisions and QOS. The Master-slave system proposes a similar application within the LAN. This in turn further benefits the optimization of traffic from the LAN and over the Internet/WAN. The master-slave system would monitor LAN network performance, always ensuring optimal latency and minimal flux/spikes for latency sensitive data. The LAN bandwidth usage would be monitored and the corresponding bandwidth on devices may be automatically throttled if it results in degradation of performance for latency sensitive data on the LAN. Through the master-slave monitoring and control, it would be able to detect the "tipping point", ensuring that LAN bandwidth can be as high as possible, but immediately throttle bandwidth once degradation in network performance is noticed, which will impact latency sensitive data. This control will allow a good balance of bandwidth and performance; while the master computer could adjust this balance as required.

The software determines latency sensitive, bandwidth sensitive, and not latency sensitive not bandwidth sensitive classifications based upon a set of rules. The set of rules that determine whether or not the internet data is latency sensitive or not may be stored locally within the program files of the software. In this case, the set of rules needs to be updated every once in a while to ensure that the set of rules being used by the software is the most up to date set of rules being used by the present invention. The set of rules is updated via a quick download from the internet as is commonplace in the field of computing to keep programs and games up to date. Alternatively, the set of rules may be stored on a server which is accessed by the software through a network connection. In general, latency sensitive data includes: 1) Any real-time communications, 2) Any non-cacheable content. In general, non-latency sensitive data includes: 1) Not real-time communications, 2) Any cacheable content. Data for exclusion typically includes security or authentication data, or generally data that we decide not to handle. As an example, we might decide to allow users to authenticate directly with a service provider, instead of doing so through WTFast servers. Bandwidth sensitive may include any large downloads or data streams that require a lot of bandwidth. The data traffic can be directly classified by the service provider, which can also be a content provider, or a broadband provider. The data traffic can also be indirectly classified by doing network forensics to determine the traffic classification. Traffic classifications can be determined by the application(s) being run, ports, IP addresses, traffic type, QOS tagging or any other method of traffic classification.

Figure 2:
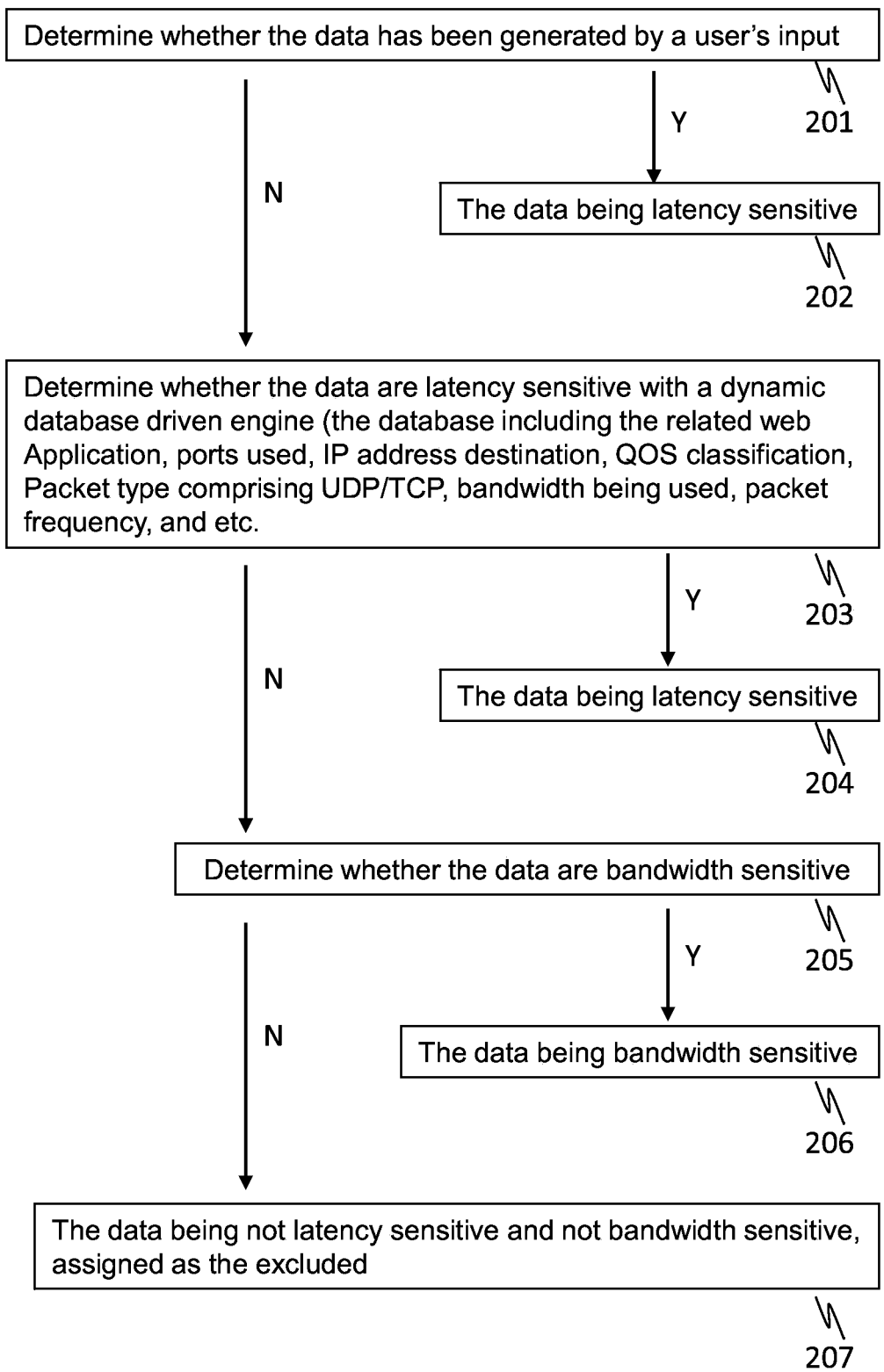
FIG. 2 is a flow chart depicting the basic procedure whereby the characteristic of the internet data sent out are determined and thus sorted.

In particular, as shown in FIG. 2, the internet data are firstly checked whether it is the data generated by a user's input 201. As the rule of thumb is that the data or action generated by a user is the latency sensitive data, and such data will always be treated as the latency sensitive data 202. Following this step, the data that are not generated by a user's input will next be determined whether the data are latency sensitive data. A dynamic database driven engine where different traffic patterns and classifications can be stored will be used to automatically identify the flow of latency sensitive data 203. This database will be updated frequently in order to make the determination of latency sensitivity as accurate as possible. Many different characteristics regarding the type (latency sensitivity) of data are incorporated in the database, such as the web application being used, port(s) used, IP address destination for the traffic, QOS classifications (Quality of service, in computer network trafficking it refers to resource reservation control mechanisms), packet type (such as UDP/TCP, i.e., Transmission Control Protocol and User Datagram Protocol), the bandwidth used and the packet frequency, and so on. This list is not exhaustive and is actually frequently modified. So, the traffic data flow is compared against this dynamic database to determine whether it is latency sensitive or not.

Following the foregoing procedure, the data are further sorted as the latency sensitive data 204, and the remaining, which will be further determined of their sensitivity to the bandwidth 205. In the case when the data are determined to be bandwidth sensitive data 206, it will be rerouted to the pathway that is specific for the bandwidth sensitive data. The remaining data, which are neither latency sensitive data nor bandwidth sensitive data, will be assigned as the excluded 207, i.e., they will be excluded from the rerouting process; and thus will go through the routine internet connection to their respective destination. The sorted latency sensitive data or flow will be rerouted to the specific route, the Gamers Private Network (GPN), which allows the minimal latency, hop, loss, etc.

Figure 3:
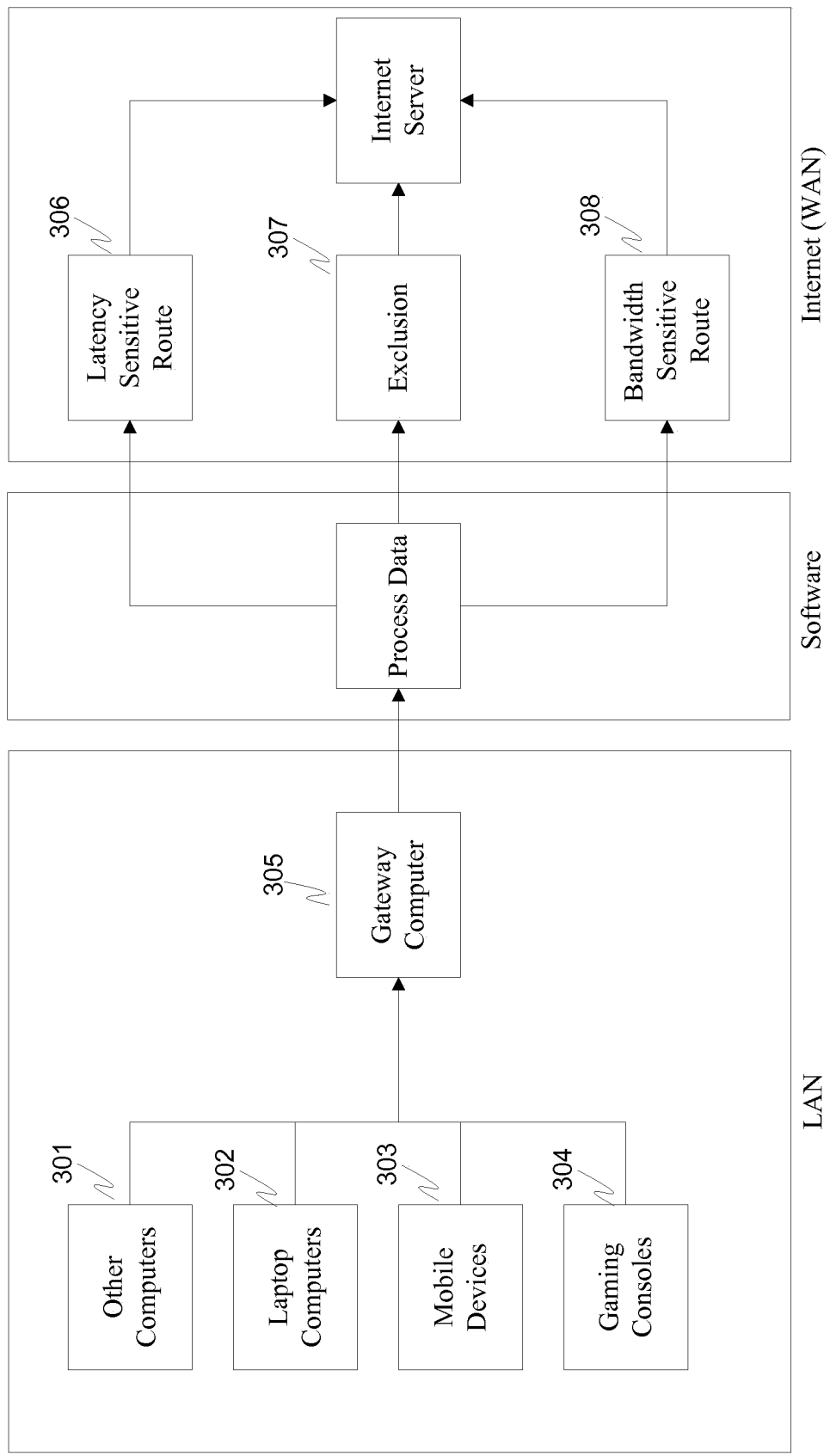
FIG. 3 is a flow chart depicting how the computer with the software installed may serve as a gateway computer for the LAN, thus, allowing all internet accessing devices within the LAN to benefit from the functions of the present invention.
Figure 4:
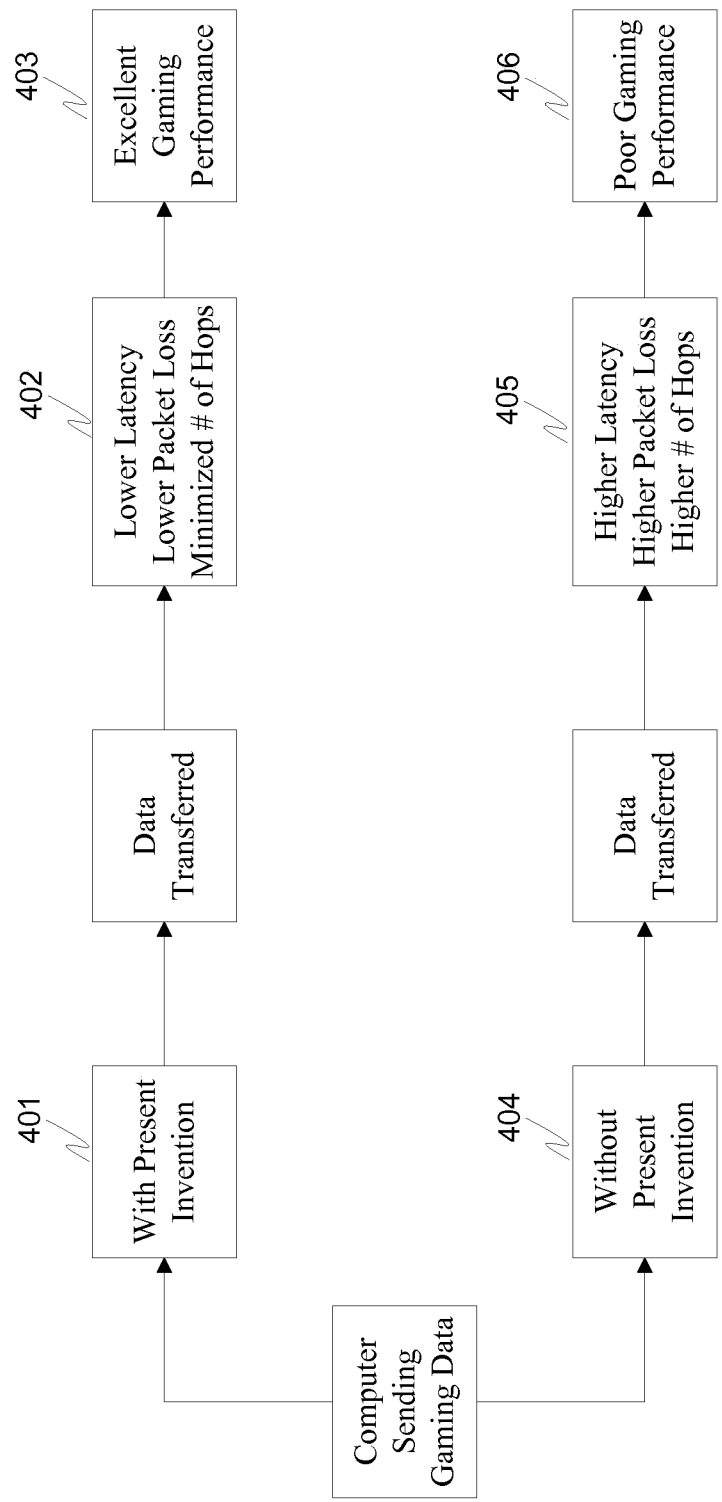
FIG. 4 is a flow chart showing a comparison between gaming while using the present invention and gaming while not using the present invention.

In reference to FIGS. 3 and 4, for each local area network (LAN), there would be at least one computer or the like that has been installed with the software that makes it function as a gateway computer 305 to access to the Gamer Private Network (GPN). As for the LAN, it may not only comprise computers, including the gateway computer 305 and other computers 301, laptop 302, tablet, etc., but also comprise mobile phones 303 and gaming consoles 304. Via the designated gateway computer, the data flow from each device within the LAN can be rerouted to the GPN, as long as such flow or data has been classified as the latency sensitive data. Moreover, as described previously, the data sent from a device of the LAN may be transmitted to the respective destination server through different type of route, namely they may be rerouted to the GPN latency sensitive route 306, rerouted to the bandwidth sensitive route 308 or the routine route 307 that is excluded from the rerouting process if the data are neither latency sensitive nor bandwidth sensitive.

The effect of rerouting the latency sensitive data to the GPN would be very significant. As shown in FIG. 4, the data flow transmission to the destination server following the routine route without implementation of the present invention 404 may have the issues of high latency, high packet loss and high number of hops 405; and thus result in a very poor gaming performance 406. In contrast, with the implementation of the present invention 401, the data transfer will be much smoother with quite low latency, low packet loss and low number of hops 402. In addition, all of these factors will contribute to the user's excellent gaming performance 403. It may make online game connections up to 70% faster, smoother and stronger.

In addition to the aforementioned significantly improved gaming experience, another fundamental feature of an embodiment of the present invention would be that it is a true client (gamer) based solution for intelligently delivering or routing the traffic and data flow. Traditionally, the content delivery networks (CDNs) deliver data via a top down style approach. Those large companies decide how data should flow from their servers from the top level, to the users who are down at the bottom. Following this process, most of user's data flows will be indiscriminately transmitted, regardless of the property, sensitivity of the data, as well as the user's favor and experience. With the solution provided by an embodiment of the present invention, which utilizes a specific Gamers Private Network (GPN) network, such as may be employed by WTFast, for transferring sorted latency sensitive data, it has flipped it upside down to a bottom up style, wherein the users have a say about how his or her data should be transferred. In this way, the users are in control of their data's transmission over the internet. WTFast is the first such service in the world, which functions like a consumer driven CDN. Therefore, by virtue of the WTFast technology, the average consumers are bestowed the capability of access to the global CDN infrastructure.

Figure 5:
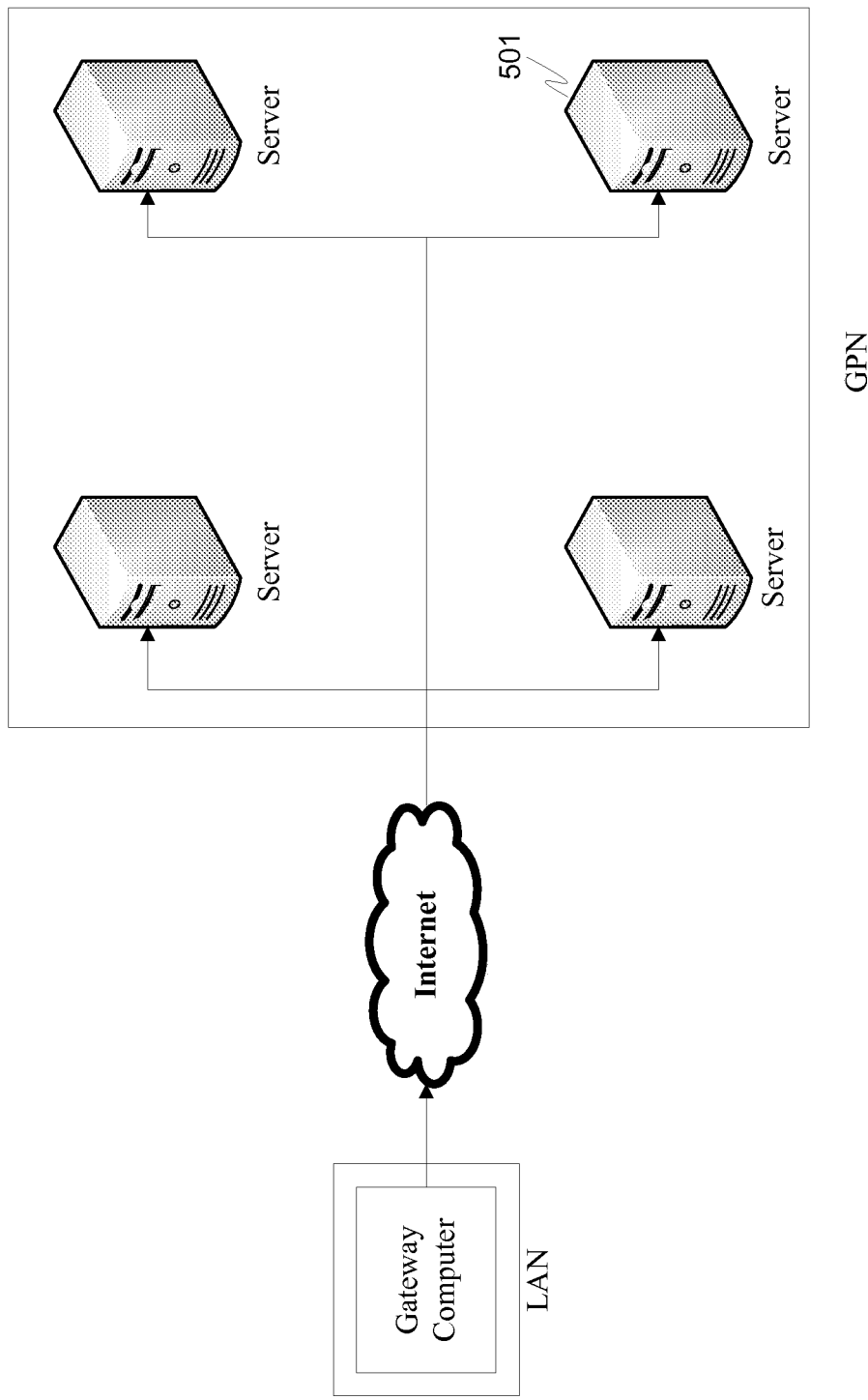
FIG. 5 is a flow chart showing a conceptualization of the Gamers Private Network (GPN) of the present invention.

Concerning the GPN, according to an embodiment of the present invention, it includes a plurality of servers 501 which may be geographically dispersed, for example located around the world, as shown in FIG. 5. The global distribution of the plurality of servers ensures that a good connection can be established between the GPN and the individual gateway computers. When the internet data that is classified as latency sensitive is sent from or through a gateway computer, the software installed on the gateway computer will reroute the internet data such that the internet data is sent between the plurality of servers of the GPN for as long as possible before being handed over to either internet service provider (ISP) servers or directly to the destination server. Among them, handing the internet data from the gateway computer via the GPN directly to the destination server is the most ideal approach, as this allows the internet data to avoid the often unreliable performance of internet service provider servers and routers, which is particularly critical for the latency sensitive data.

Figure 6:
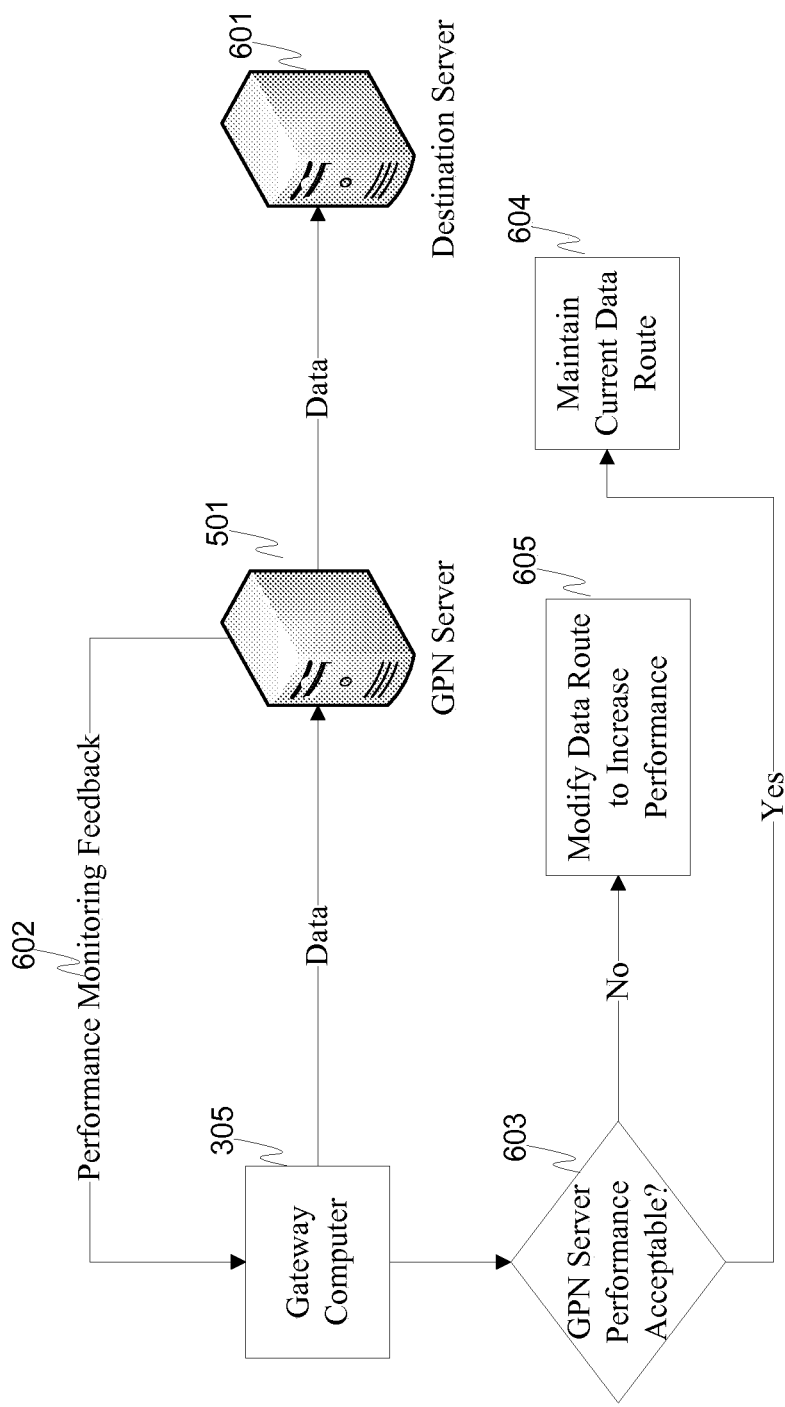
FIG. 6 is a flow chart depicting how the present invention utilizes performance information about the plurality of servers of the GPN as feedback to further optimize the route taken by the internet data.
Figure 7:
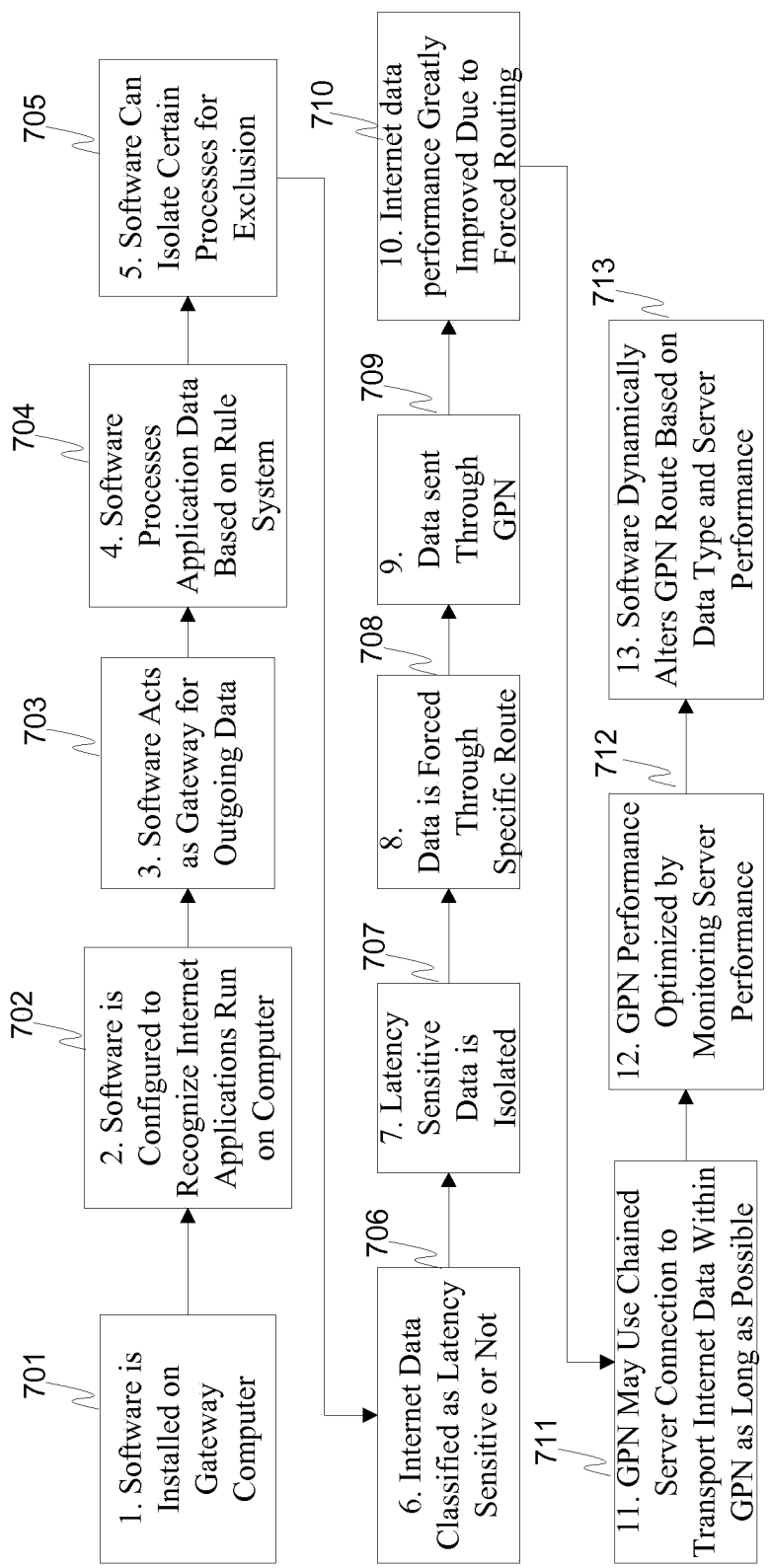
FIG. 7 is a flow chart showing the overall steps followed by the method of the present invention.

Due to the dynamic real time internet traffic conditions, the best available GPN server connection for a particular destination server may change frequently. The GPN route is continuously monitored and accordingly modified, so as to reach the optimal traffic route for a respective latency sensitive traffic. Therefore, GPN is rather a dynamic route than a fixed one. In reference to FIG. 6, during the process of data transmission from the gateway computer to the destination server 601 by way of GPN that includes a series of GPN servers 501, the condition and performance of data transfer has been continuously monitored, and the feedback will be sent back 602 to the gateway computer for analysis. It will be determined whether the GPN performance is acceptable, against a pre-determined threshold 603. If the GPN performance is determined to be acceptable, the current GPN route will be maintained and no need to make a change 604. But if the performance of the current GPN route is not acceptable, the GPN route will be modified in order to improve its performance 605. In the present invention, the GPN monitoring system keeps monitoring the server to server connections of the GPN. This kind of monitoring function ensures the optimal server to server connections within the GPN network. The aim is to control as many as possible of these connections as possible from end to end within the GPN route. In this way, as long as the latency sensitive data has been rerouted to the GPN network of the present invention, the data transmission results would be known. On the other hand, when data are currently not within the GPN network of the present invention, the transmission result would not be known; so certain estimation and approximations need to be made in order to optimize the transmission route, the connections between the respective servers, and the connections between the GPN network and the unknown networks. This is true in many cases with destination servers. This is especially true in cases where certain parts of the Internet "trip" block network monitoring tools. Therefore, if more of the connection end to end via the GPN can be controlled, the reliability of the entire transmission will be greatly improved, such as the improvements of average latency, flux/deviation and latency spikes. However, if a large portion of the Internet trip is unknown or uncontrolled, the reliability of the data transmission would be significantly reduced.

The method is the overall process followed by the present inventions and comprises the following basic steps which are described in detail in the subsequent paragraphs. Step one 701; the software is installed onto a computer, thus, creating the gateway computer as defined above. The software operates to optimize and improve routing for data traffic as described above.

Step two 702; the software is configured to recognize, identify, and process applications run on the gateway computer that send data over the internet. This identification process allows the software to determine which applications that are running on the gateway computer.

Step three 703; the software acts as a gateway as all outgoing internet traffic from the LAN is sent through the gateway computer. This is important as the gateway computer may serve to reroute the internet data coming from a multitude of different computers and devices that are part of the LAN. This is depicted in FIG. 3 which shows how multiple internet-enabled devices may receive the benefits of the present invention as all latency sensitive internet data sent out of the LAN is sent out through the gateway computer.

Step four 704; the software processes all the internet data sent through the gateway computer based upon the set of rules as discussed above. In the preferred embodiment of the present invention, the set of rules uses primarily port information, QOS and the internet protocol destination address to determine whether or not the internet data is latency sensitive. It is understood that other methods of identifying whether or not the internet data is latency sensitive may be used without departing from the scope and spirit of the present invention.

Step five 705; the software identifies and isolates specific processes that are sending internet data, excluding that internet data from being sent over the GPN. The processes excluded from the GPN in this step are most commonly secure connections such as those to a virtual private network, or logins. By excluding such processes, the present invention dissuades potential antagonists such as hackers from using the present invention to their advantage for committing acts such as theft of accounts and passwords.

Step six 706; the internet data sent through the gateway computer is classified as either latency sensitive or non-latency sensitive. The classification of the internet data is done using the rule set mentioned above.

Step seven 707; the internet data that is classified as latency sensitive is isolated and forced to be sent out of the LAN via a non-shaped port. The internet data classified as latency sensitive may also be tagged or otherwise marked such that it can be more readily identified by routers and servers as latency sensitive.

Step eight 708; the internet data is dynamically routed through the GPN. The rule system determines whether or not all or only a portion of the internet data is routed through the GPN. A good example of this can be seen in online games which often use a combination of both latency sensitive and non-latency sensitive internet data. The internet data from online games that is latency sensitive contains information about player actions. The non-latency sensitive interment data sent out by online games includes things like login information and update or patch downloads which contain new program files meant to optimize the game or fix issues. The ability to separate out which portions of the internet data sent by a single application or game is crucial to keeping the network connections of the GPN which are reserved for latency sensitive data performing at maximum. Other portions of the GPN are reserved for internet data that requires high bandwidth to be sent quickly. An example of internet data that requires the use of high bandwidth servers includes downloading patches and updates and streaming videos.

Step nine 709; the internet data sent through the GPN is forced to take the most efficient path through the GPN. The performance of all the servers in the GPN is monitored and routing of the internet data through the GPN is done based upon the real time performance values of the plurality of servers within the GPN. A flowchart depicting this feedback base routing can be seen in FIG. 6.

Step ten 710; the performance of sending and receiving internet data is greatly improved by ensuring that the local internet service provider treats the internet data marked as latency sensitive appropriately. The forced routing used by the present invention removes choke points as well as routers that have high packet loss from the route taken by the internet data. Additionally, the number of transfers from router to router or server to server between the LAN and the destination server is greatly reduced. The reduction in transfers also helps to improve performance as packet loss is minimized or altogether eliminated.

Step eleven 711; the GPN may use a chained server connection. The chained server connection ensures that the transfer from internet service providers and GPN is as close to the LAN as possible. The closer the GPN servers are to the LAN, the higher the potential for improved performance when using the present invention. The chained server connection of the GPN ensures that the internet data stays on the GPN for as long as possible during the route from start to finish, thus, ensuring maximum performance gain when using the present invention.

Step twelve 712; the performance of the GPN is optimized by constantly monitoring performance metrics of the plurality of servers within the GPN in real time. This information can be used by the software to intelligently route the internet data through the GPN.

Step thirteen 713; the software dynamically alters the route through the GPN taken by the internet data based upon the performance metrics of the plurality of servers of the GPN measured in step twelve. Additionally, the software uses information about the destination server to influence the route taken through the GPN by the internet data. This dynamic routing maximizes performance gain can be experienced by the user of the present invention.

As it can be appreciated in the above paragraphs, in some embodiments of the present invention, the routing and optimization of data is performed by analyzing the data by a gateway computer within a local area network (LAN). The routing decision of data is performed by the gateway computer within the LAN based on the analysis. For example, the gateway computer analyzes the data and routes the data accordingly based on latency requirements.

According to an another embodiment of the present invention, there is provided a cloud based routing system wherein the same routing decisions as described in the above paragraphs are made by a thin client that can be installed on a listener/reporter device, such as a router, a gateway, modem, or an edge device, that is not located within the LAN but instead located outside of the LAN. In an embodiment, the listener/reporter can be implemented as thin client which can be a network listener software application that can analyze data flow coming from the various LANs. The listener/reporter (e.g. implemented as a software application) can be installed on an edge device outside of the LAN. The edge device can serve many households or many LANs. The edge device gets routing instructions from a Central Processing Matrix (CPM). In an embodiment, the CPM contains unique network signatures for each of the applications that have their network traffic being optimized. The listener/reporter identifies the traffic on the LAN, informing the edge device, and the edge device gets the network signatures from the CPM to determine how the traffic should be handled at the edge device. In an embodiment, the CPM can be one or more servers on the Internet that contains the unique network signatures and the routing instructions for them across the network.

In an embodiment, the listener/reporter can be a proxy listener/reporter that uses proxy technology. In another embodiment, the listener/reporter can use a Virtual Private Network (VPN) or tunneling protocols. Tunneling protocols are methods for transporting data across a network using protocols that are not supported by that network. Tunneling protocols work by encapsulating packets or wrapping packets inside of other packets. Tunneling protocols are often used in VPNs. Because the packets are encapsulated or wrapped inside other packets, the packets can also be encrypted if desired. In addition, tunneling protocols can also be used to passthrough network firewalls.

Figure 8:
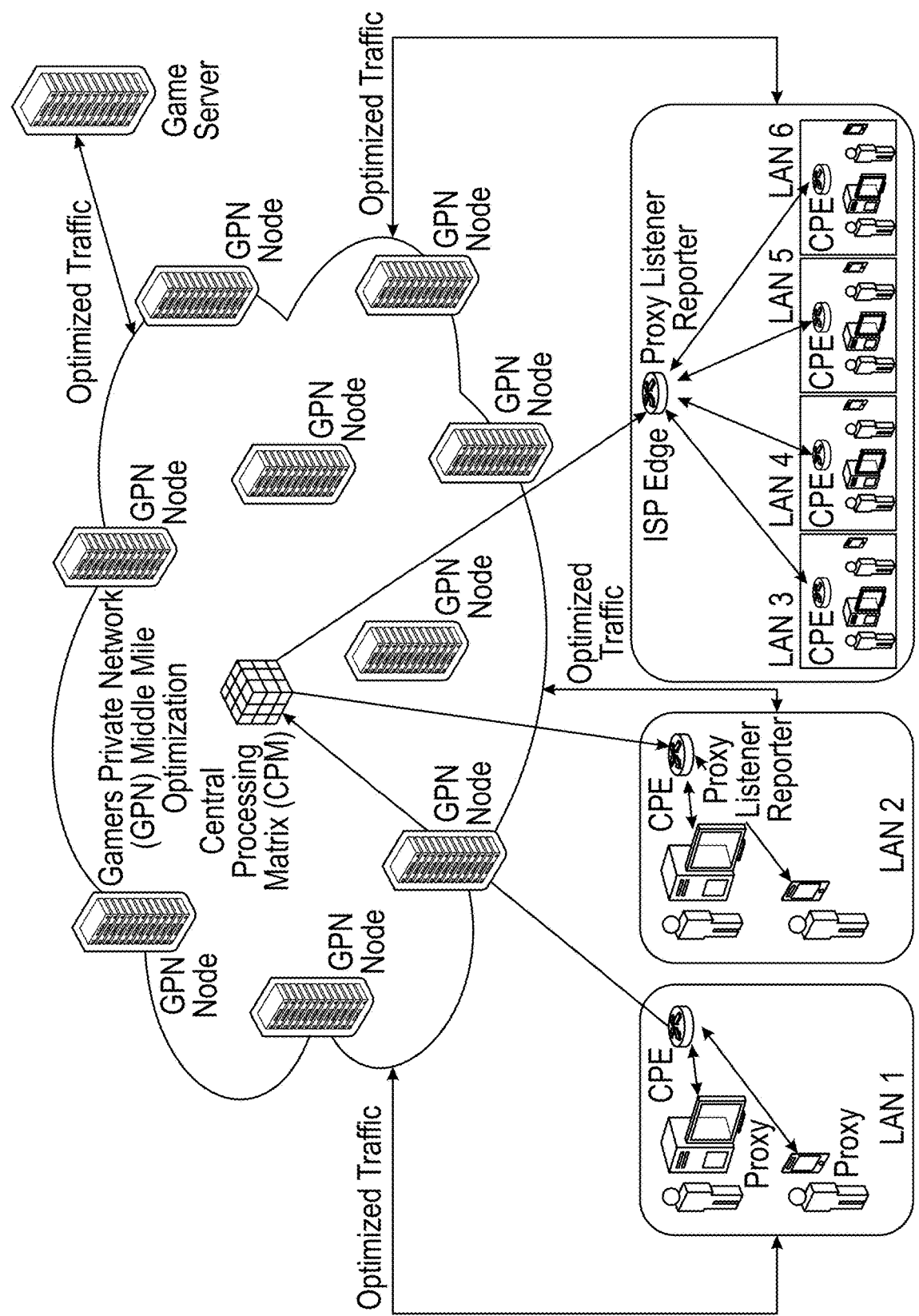
FIG. 8 is a schematic diagram showing a network configuration wherein the routing and optimization of data is performed by analyzing the data by a gateway computer inside a LAN or LANs and wherein the routing and optimization of data is performed by a thin client that is installed on a listener/reporter device (e.g., a router, a gateway, modem, or an edge device) that is located outside of the LAN or LANs, according to an embodiment of the present invention.

FIG. 8 is a schematic diagram showing a network configuration wherein the routing and optimization of data is performed by analyzing the data by a gateway computer inside a LAN or LANs and wherein the routing and optimization of data is performed by a thin client that is installed on a listener/reporter device (e.g., a router, a gateway, modem, or an edge device) that is located outside of the LAN or LANs, according to an embodiment of the present invention. As described in the above paragraphs, the routing decision of data is performed by the gateway computer within the LAN based on the analysis, as shown in LAN1 and LAN2. In an embodiment, the listener/reporter can be classified as a gateway computer. The expectation is that the gateway computer can do more data processing and analysis (big client), while the listener/reporter just listens/reports (thin client). In an embodiment, for the system to work, there is provided a combination of gateway computers for data processing and analysis, which could be on device, on LAN, or outside of LAN and listener/reporter devices which help inform the gateway computers and the CPM of the data being processed. In an embodiment, the listener/reporter device gives more flexibility with regards to device integrations that do not have a lot of resources available, or devices that already exist in the network that can be updated. For example, the gateway computer analyzes the data and routes the data accordingly based on latency requirements. For example, LAN1 and LAN2 can include the proxy user which can be any type of device such as a tablet, a smartphone, a desktop computer, etc., and a gateway device/CPE. The proxy user is configured to communicate with the gateway device/CPE. The gateway device/CPE is in turn configured to communicate with an internet based server (e.g., a game server) through the internet, for example via the Central Processing Matrix (CPM). In LAN1 and LAN2, the CPE or gateway device is located within LAN1, LAN2. For example, in LAN1 or LAN2 or both, the gateway/CPE device can send network steering data to a Central Processing Matrix (CPM) located within the "middle mile" and/or receive network steering instructions from the CPM. The "middle mile" is the Internet that exists between an end-user computer and a target server. Typically, the first mile is defined as the network between a server (e.g., a game server) and the connection to the internet. The last mile is defined as the network between an end user and their connection to the internet. The middle mile is the connection between the first mile and last mile on the internet. The middle mile is typically the longest trip data takes across the internet. Steering data is sent to and/or received by the gateway/CPE to or from the device Central Processing Matrix (CPM). In an embodiment, the proxy on device and/or listener/reporter on the CPE sends data to the CPM, and also gets routing instructions from the CPM. The proxy on device and/or listener/reporter provides data/context based on historical traffic patterns, which are used to inform future routing decisions by the CPM.

The client intelligence collected inside each LAN (e.g., LAN 1, LAN2) is used to send steering data to the CPM. The CPM can then be used to send routing instructions to CPE devices that serve many devices/clients. Client intelligence (e.g., historical network data) is provided by clients (e.g., PCs, mobiles, consoles, Internet-of-Things (IOT) devices, etc. or any network connected LAN devices). Data/context is provided based on historical traffic patterns to send future routing decisions informed by the CPM to devices that serve many devices or LANs (routers or edge devices).

Each of LAN3, LAN4, LAN5 and LAN6 also includes a proxy user which can be any type of device such as a tablet, a smartphone, a desktop computer, etc., and a gateway device/CPE. The proxy user within a specific LAN is configured to communicate with the gateway device/CPE within that LAN. However, instead of the CPE being configured to communicate with a server (e.g., a game server) via the internet, for example through the CPM, the CPE within each LAN (LAN3, LAN4, LAN5, LAN6) is configured to communicate with a listener/reporter first. The listener/reporter is then configured to communicate via the internet to the server (e.g., game server), for example through the CPM. The listener/reporter is located outside of a LAN (e.g., outside of LAN3, LAN4, LAN5 and LAN6). The listener/reporter can be located further away from the LANs. In addition, the listener/reporter serves more than one LAN (two or more LANs), for example hundreds or even thousands of LANs. For example, the listener/reporter device can be located at an Internet Service Provider (ISP) edge. The listener/reporter device (e.g., ISP edge device) gets network steering instructions from the CPM. After receiving steering instructions, the ISP edge device changes the routing of the data across the middle mile (for example, via the GPN), based on the steering instructions provided by the CPM. In the case of LAN3, LAN4, LAN5, LAN6, the routing and optimization of data is not performed by analyzing the data by the CPE inside the LANs (e.g., LAN3, LAN4, LAN5, LAN6). Instead, the routing and optimization of data is performed by the listener/reporter. The listener/reporter can be implemented as a thin client.

One benefit of providing the routing and optimization of data implemented on an edge device is ease of distribution. Indeed, instead of or in addition to deploying the routing and optimization of data to each of the CPE device in every LAN, the routing and optimization of data can be also deployed to the listener/reporter device which serves many LANs. A small percentage of LANs within households, for example, would still implement the routing and optimization of data using their gateway/CPE device. This small percentage can be used to collect steering intelligence to send routing instructions to the CPM. Once the CPM has the routing instructions, it can then send steering instructions to CPE devices (serving all devices at each household), or to the listener/reporter serving a plurality of LANs (e.g., serving all households in a neighborhood). However, providing the routing and optimization at the listener/reporter edge device facilitates supporting more households, with less equipment and no house visit required.

The proxy listener/reporter edge device can be provided on a network device that operates higher up the network on Layer 2 and serves multiple households in a neighborhood. For example, a cable modem termination system (CMTS) in a coaxial network essentially that performs the same function as a DSLAM unit in a DSL network can be used as the listener/reporter to implement the routing and optimization of data as described in the above paragraphs. In the same way that a DSLAM feeds subscriber lines to the Internet service provider (ISP), a Cable Modem Termination System (CMTS) feeds the data of hundreds of cable modems and connects users to their ISPs. For example, a WAN edge router serving many households can also be used as the listener/reporter to implement the routing and optimization of data as described in the above paragraphs.

This methodology or system can also be applied to network quality of service (QOS) which is a measurement of the overall performance of a service such as a computer network or a cloud computing service. To quantitatively measure the QOS of a network, several aspects of the network can be considered such as packet loss, bit rate, throughput, transmission delay, jitter, etc. This methodology or system can also be applied to traffic classification or steering for 5G cellular network slicing. In order for the QOS or for a network slicing to work properly, the QOS needs to be properly managed or steered. If all data is treated as having higher priority, then nothing will be prioritized and high priority. The method or methods described in the above paragraphs can ensure proper steering of the QOS, network slicing technologies, or similar techniques or technologies.

Figure 9:
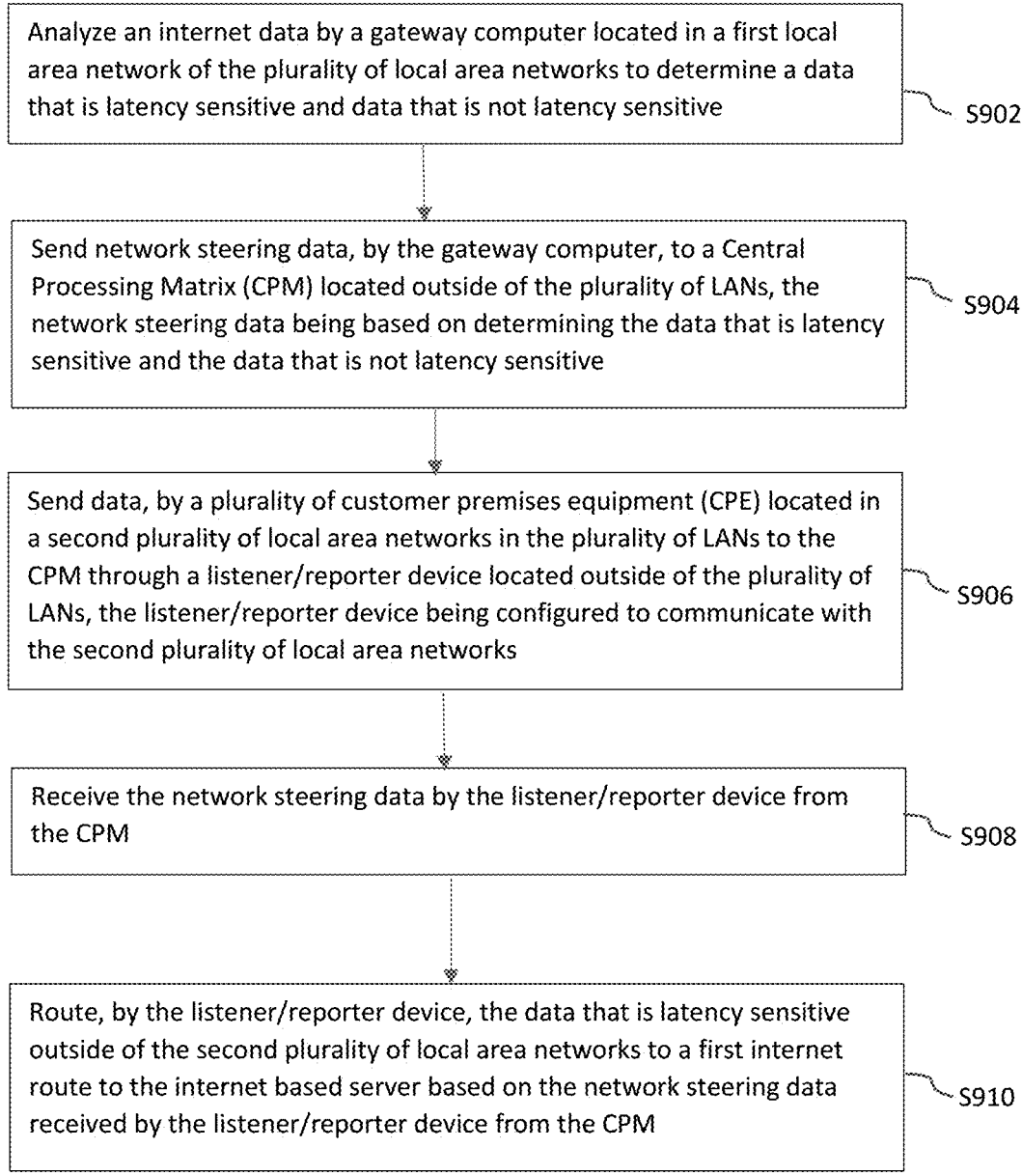
FIG. 9 is a flow chart of a method for optimizing internet traffic from a plurality of local area networks (LANs) to an internet based server connected to internet, according to an embodiment of the present invention.

As it must be appreciated from the above paragraphs, a method for optimizing internet traffic from a plurality of local area networks (LANs) to an internet based server connected to internet is provided. FIG. 9 is a flow chart of the method for optimizing internet traffic from a plurality of local area networks (LANs) to an internet based server connected to internet, according to an embodiment of the present invention. The method includes:

(a) analyzing an internet data by a gateway computer located in a first local area network of the plurality of local area networks to determine a data that is latency sensitive and data that is not latency sensitive, at S902.

(b) sending network steering data, by the gateway computer, to a Central Processing Matrix (CPM) located outside of the plurality of LANs, the network steering data being based on determining the data that is latency sensitive and the data that is not latency sensitive, at S904.

(c) sending data, by a plurality of customer premises equipment (CPE) located in a second plurality of local area networks in the plurality of LANs to the CPM through a listener/reporter device located outside of the plurality of LANs, the listener/reporter device being configured to communicate with the second plurality of local area networks, at S906.

(d) receiving the network steering data by listener/reporter device from the CPM, at S908.

(e) routing, by the listener/reporter device, the data that is latency sensitive outside of the second plurality of local area networks to a first internet route to the internet based server based on the network steering data received by the listener/reporter device from the CPM, at S910.

In an embodiment, the routing by the listener/reporter device the data that is latency sensitive outside of the second plurality of local area networks to the internet based server comprises dynamically modifying an internet route within the internet between the listener/reporter device and the internet based server based on the network steering data.

In an embodiment, the listener/reporter device is located at an internet service provider (ISP) edge. In an embodiment, the listener/reporter device is implemented as a thin client on an edge device. In an embodiment, the listener/reporter device includes a cable modem termination system (CMTS) in a coaxial network. In an embodiment, the listener/reporter device comprises a wide area network (WAN) edge router. In an embodiment, the second plurality of local area networks are a plurality of households local area networks.

In an embodiment, the method further includes communicating data received by the listener/reporter device to the internet based server via the CPM.

In an embodiment, the analyzing the internet data by the gateway computer to determine the data that is latency sensitive and the data that is not latency sensitive includes sorting the internet data into a plurality of categories, wherein the plurality of categories comprises a latency sensitive category and a not latency sensitive category, wherein the data that is latency sensitive is sorted into the latency sensitive category.

In an embodiment, the method further includes establishing a first criterion of a set of internet data features; analyzing the internet data not generated by a user input based on the first criterion; and sorting the internet data not generated by the user input into the latency sensitive category, when the internet data not generated by the user input meet the first criterion.

In an embodiment, the set of internet data features includes at least one data feature selected from a list consisting of type of internet application, type of data port, destination Internet Protocol (IP) address, quality of service (QOS) classification, type of data packet, bandwidth being used, and packet frequency.

In an embodiment, the method further includes establishing a second criterion; analyzing the data that is not latency sensitive, wherein the not latency sensitive category comprises a bandwidth sensitive category and an exclusion category; determining whether the data that is not latency sensitive is bandwidth sensitive data based on the second criterion; and sorting the bandwidth sensitive data into the bandwidth sensitive category.

In an embodiment, the method also includes sorting a remaining data into a category of exclusion, wherein the remaining data has not been sorted into the latency sensitive category or the bandwidth sensitive category.

In an embodiment, the method further includes routing the data sorted in the bandwidth sensitive category to a second internet route to the internet based server; excluding the data sorted in the exclusion category from the first internet route and from the second internet route; and transmitting the data sorted in the exclusion category to a third internet route to the internet based server.

In an embodiment, the first internet route is a gamer private network; the gamer private network comprises a plurality of computer servers and a plurality of connections between the plurality of computer servers; and the plurality of computer servers are distributed.

In an embodiment, the method further includes continuously monitoring a performance of the gamer private network; sending a feedback of performance to the gateway computer; establishing a performance threshold; determining whether the performance of the gamer private network is acceptable based on the performance threshold; and modifying server connections within the gamer private network if the performance is not acceptable based on the performance threshold.

In an embodiment, the method also includes determining a network quality of service (QOS) based on the network steering data. In an embodiment, determining the QOS comprises determining at least one of packet loss, bit rate, throughput, transmission delay, and jitter based the network steering data. In an embodiment, the method further includes classifying network traffic based on the network steering data.

As it can be appreciated from the above paragraphs, there is also provided a network system for optimizing internet traffic from a plurality of local area networks (LANs) to an internet based server connected to internet. The network system includes a gateway computer located in a first local area network of the plurality of local area networks, the gateway computer configured to analyze an internet data to determine a data that is latency sensitive and data that is not latency sensitive. The network system also includes a Central Processing Matrix (CPM) located outside of the plurality of LANs, the CPM being configured to receive network steering data from the gateway computer, the network steering data being based on determining the data that is latency sensitive and the data that is not latency sensitive; and a plurality of customer premises equipment (CPE) located in a second plurality of local area networks in the plurality of LANs to the CPM.

The network system further includes a listener/reporter device located outside of the plurality of LANs and being configured to communicate with the second plurality of local area networks, the CPE being configured to send data through the listener/reporter device located outside of the plurality of LANs. The listener/reporter device is configured to receive the network steering data from the CPM and to route the data that is latency sensitive outside of the second plurality of local area networks to the internet based server based on the network steering data received by the listener/reporter device from the CPM.

Figure 10:
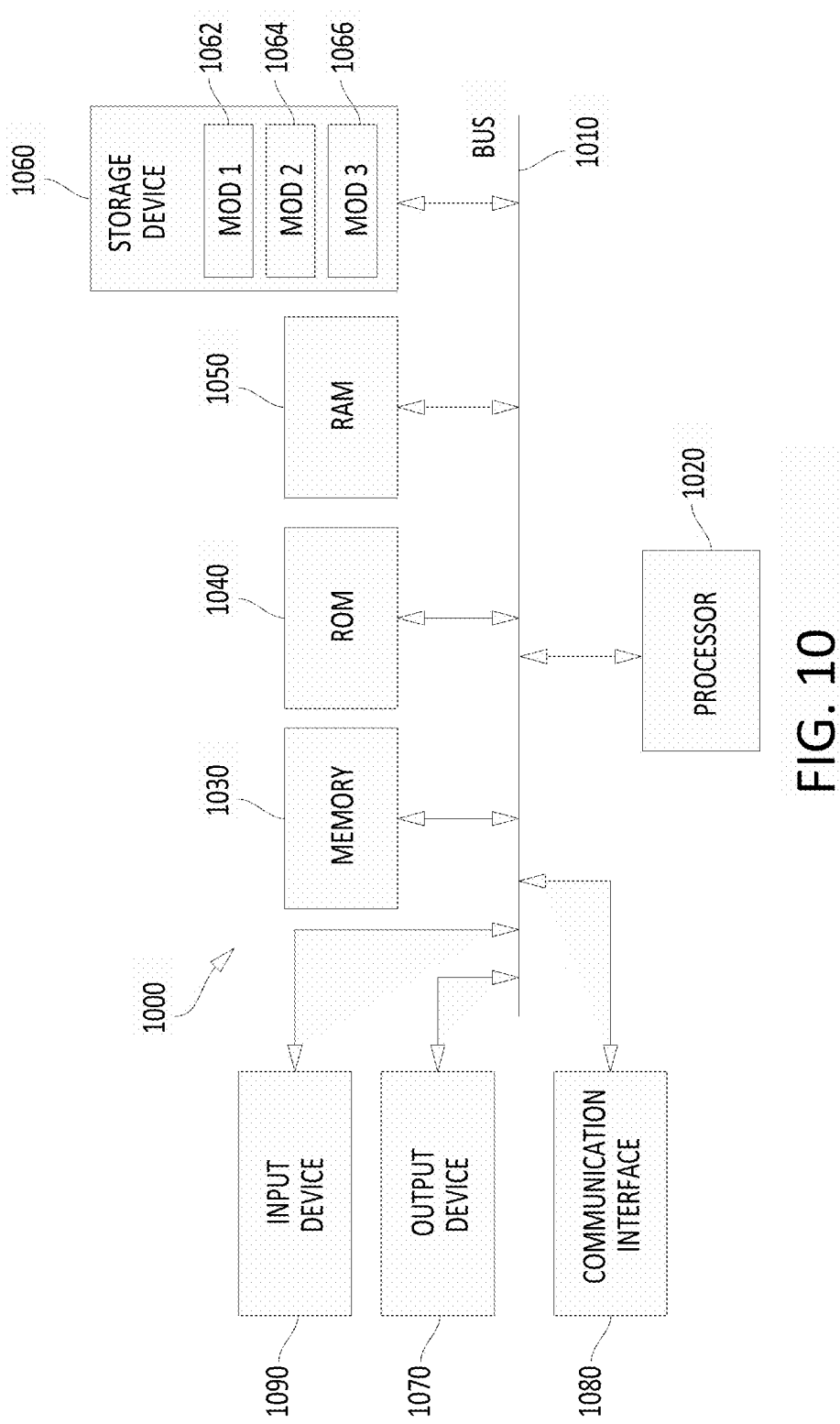
FIG. 10 is schematic diagram of a general purpose computing device that can be used within a LAN, according to an embodiment of the present invention.

FIG. 10 is schematic diagram of a general purpose computing device 1000 that can be used within a LAN, according to an embodiment of the present invention. The computing device 1000 shown in FIG. 10 can also be used as a gateway computer as described in the above paragraphs. The computing device 1000 includes a processing unit (CPU or processor) 1020 and a system bus 1010 that couples various system components including a system memory 1030 such as read-only memory (ROM) 1040 and random access memory (RAM) 1050 to the processor 1020. The system 1000 can include a cache of high-speed memory connected directly with, in close proximity to, or integrated as part of the processor 1020. The system 1000 copies data from the memory 1030 and/or a storage device 1060 to the cache for quick access by the processor 1020. In this way, the cache provides a performance boost that avoids processor 1020 delays while waiting for data. These and other modules can control or be configured to control the processor 1020 to perform various actions. Other system memory 1030 may be available for use as well. The memory 1030 can include multiple different types of memory with different performance characteristics. It can be appreciated that the disclosure may operate on a computing device 1000 with more than one processor 1020 or on a group or cluster of computing devices networked together to provide greater processing capability. The processor 1020 can include any general purpose processor and a hardware module or software module, such as module 1 1062, module 2 1064, and module 3 1066 stored in storage device 1060, configured to control the processor 1020 as well as a special-purpose processor where software instructions are incorporated into the actual processor design. The processor 1020 may essentially be a completely self-contained computing system, containing multiple cores or processors, a bus, memory controller, cache, etc. A multi-core processor may be symmetric or asymmetric.

The system bus 1010 may be any of several types of bus structures including a memory bus or memory controller, a peripheral bus, and a local bus using any of a variety of bus architectures. A basic input/output (BIOS) stored in ROM 1040 or the like, may provide the basic routine that helps to transfer information between elements within the computing device 1000, such as during start-up. The storage device 1060 is connected to the system bus 1010 by a drive interface. The drives and the associated computer-readable storage media provide nonvolatile storage of computer-readable instructions, data structures, program modules and other data for the computing device 1000. In one aspect, a hardware module that performs a particular function includes the software component stored in a tangible computer-readable storage medium in connection with the necessary hardware components, such as the processor 1020, bus 1010, display 1070, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 1000 is a small, handheld computing device, a desktop computer, or a computer server.

Although the exemplary embodiment described herein employs the hard disk 1060, other types of computer-readable media which can store data that are accessible by a computer, such as magnetic cassettes, flash memory cards, digital versatile disks, cartridges, Solid State Drives (SSDs), random access memories (RAMs) 1050, and read-only memory (ROM) 1040, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 1000, an input device 1090 represents any number of input mechanisms, such as a microphone for speech, a touch-sensitive screen for gesture or graphical input, keyboard, mouse, motion input, speech and so forth. An output device 1070 can also be one or more of a number of output mechanisms known to those of skill in the art. In some instances, multimodal systems enable a user to provide multiple types of input to communicate with the computing device 1000. A communications interface 1080 generally governs and manages the user input and system output. There is no restriction on operating on any particular hardware arrangement and therefore the basic features here may easily be substituted for improved hardware or firmware arrangements as they are developed.

Although the present invention has been explained in relation to its preferred embodiment, it is to be understood that many other possible modifications and variations can be made without departing from the spirit and scope of the invention as herein described.

What is claimed:

1. A non-transitory computer-readable medium that stores instructions executable by one or more processors to perform a method for optimizing internet traffic from a plurality of local area networks (LANs) to an internet based server connected to internet, comprising:

instructions for analyzing an internet data by a gateway computer located in a first local area network of the plurality of local area networks to determine a data that is latency sensitive and data that is not latency sensitive;

instructions for sending network steering data, by the gateway computer, to a Central Processing Matrix (CPM) server computer located outside of the plurality of LANs, the network steering data being based on determining by the gateway computer the data that is latency sensitive and the data that is not latency sensitive;

instructions for sending data, by a plurality of customer premises equipment (CPE) located in a second plurality of local area networks in the plurality of LANs to the CPM server computer through a listener router device located outside of the plurality of LANs, the listener router device being configured to communicate with the second plurality of local area networks;

instructions for receiving the network steering data by the listener router device from the CPM server computer, the network steering data being based on the determination by the gateway computer located in the first local area network of the data that is latency sensitive and the data that is not latency sensitive; and instructions for routing, by the listener router device, the data that is latency sensitive outside of the second plurality of local area networks to a first internet route to the internet based server based on the network steering data received by the listener router device from the CPM server computer.

2. The non-transitory computer-readable medium of claim 1, wherein the instructions for routing by the listener router device the data that is latency sensitive outside of the second plurality of local area networks to the internet based server comprises instructions for dynamically modifying the first internet route within the internet between the listener router device and the internet based server based on the network steering data.

3. The non-transitory computer-readable medium of claim 1, wherein the listener router device is located at an internet service provider (ISP) edge.

4. The non-transitory computer-readable medium of claim 1, wherein the listener router device is implemented as a thin client on an edge device.

5. The non-transitory computer-readable medium of claim 1, wherein the listener router device comprises a cable modem termination system (CMTS) in a coaxial network.

6. The non-transitory computer-readable medium of claim 1, wherein the listener router device comprises a wide area network (WAN) edge router.

7. The non-transitory computer-readable medium of claim 1, wherein the second plurality of local area networks are a plurality of households local area networks.

8. The non-transitory computer-readable medium of claim 1, further comprising communicating data received by the listener router device to the internet based server via the CPM server computer.

9. The non-transitory computer-readable medium of claim 1, wherein the instructions for analyzing the internet data by the gateway computer to determine the data that is latency sensitive and the data that is not latency sensitive comprises instructions for sorting the internet data into a plurality of categories, wherein the plurality of categories comprises a latency sensitive category and a not latency sensitive category, wherein the data that is latency sensitive is sorted into the latency sensitive category.

10. The non-transitory computer-readable medium of claim 9, further comprising:

instructions for establishing a first criterion of a set of internet data features;

instructions for analyzing the internet data not generated by a user input based on the first criterion; and instructions for sorting the internet data not generated by the user input into the latency sensitive category, when the internet data not generated by the user input meet the first criterion.

11. The non-transitory computer-readable medium of claim 10, wherein the set of internet data features comprises at least one data feature selected from a list consisting of type of internet application, type of data port, destination Internet Protocol (IP) address, quality of service (QOS) classification, type of data packet, bandwidth being used, and packet frequency.

12. The non-transitory computer-readable medium of claim 10, further comprising:

instructions for establishing a second criterion;

instructions for analyzing the data that is not latency sensitive, wherein the not latency sensitive category comprises a bandwidth sensitive category and an exclusion category;

instructions for determining whether the data that is not latency sensitive is bandwidth sensitive data based on the second criterion; and instructions for sorting the bandwidth sensitive data into the bandwidth sensitive category.

13. The non-transitory computer-readable medium of claim 12, further comprising:

instructions for sorting a remaining data into a category of exclusion, wherein the remaining data has not been sorted into the latency sensitive category or the bandwidth sensitive category.

14. The non-transitory computer-readable medium of claim 13, further comprising:

instructions for routing the data sorted in the bandwidth sensitive category from the first internet route to a second internet route to the internet based server;

instructions for excluding the data sorted in the exclusion category from the first internet route and from the second internet route; and instructions for transmitting the data sorted in the exclusion category to a third internet route to the internet based server.

15. The non-transitory computer-readable medium of claim 1, wherein the first internet route is a gamer private network;

wherein the gamer private network comprises a plurality of computer servers and a plurality of connections between the plurality of computer servers; and wherein the plurality of computer servers are distributed.

16. The non-transitory computer-readable medium of claim 15, further comprising:

instructions for continuously monitoring a performance of the gamer private network;

instructions for sending a feedback of performance to the gateway computer;

instructions for establishing a performance threshold;

instructions for determining whether the performance of the gamer private network is acceptable based on the performance threshold; and instructions for modifying server connections within the gamer private network if the performance is not acceptable based on the performance threshold.

17. The non-transitory computer-readable medium of claim 1, further comprising instructions for determining a network quality of service (QOS) based on the network steering data.

18. The non-transitory computer-readable medium of claim 17, wherein determining the QOS comprises determining at least one of packet loss, bit rate, throughput, transmission delay, and jitter based the network steering data.

19. The non-transitory computer-readable medium of claim 1, further comprising classifying network traffic based on the network steering data.

20. The non-transitory computer-readable medium of claim 1, wherein the listener router device comprises at least one of a proxy listener router device, a Virtual Private Network (VPN) protocol, or a tunneling protocol.

21. The non-transitory computer-readable medium of claim 1, further comprising:
   instructions for continuously monitoring a performance of the CPM server computer;
   instructions for sending a feedback of performance to the listener router device;
   instructions for establishing a performance threshold;
   instructions for determining whether the performance of the CPM server computer is acceptable based on the performance threshold; and
   instructions for modifying server connections within the CPM server computer if the performance is not acceptable based on the performance threshold.

22. A method for optimizing internet traffic from a plurality of local area networks (LANs) to an internet based server connected to internet, comprising:
   analyzing an internet data by a gateway computer located in a first local area network of the plurality of local area networks to determine a data that is latency sensitive and data that is not latency sensitive;
   sending network steering data, by the gateway computer, to a Central Processing Matrix (CPM) server computer located outside of the plurality of LANs, the network steering data being based on determining by the gateway computer the data that is latency sensitive and the data that is not latency sensitive;
   sending data, by a plurality of customer premises equipment (CPE) located in a second plurality of local area networks in the plurality of LANs to the CPM server computer through a listener router device located outside of the plurality of LANs, the listener router device being configured to communicate with the second plurality of local area networks;
   receiving the network steering data by the listener router device from the CPM server computer; and
   routing, by the listener router device, the data that is latency sensitive outside of the second plurality of local area networks to a first internet route to the internet based server based on the network steering data received by the listener router device from the CPM server computer.

23. The method according to claim 22, wherein routing by the listener router device the data that is latency sensitive outside of the second plurality of local area networks to the internet based server comprises dynamically modifying an internet route within the internet between the listener router device and the internet based server based on the network steering data.

24. The method according to claim 22, wherein the listener router device is located at an internet service provider (ISP) edge.

25. The method according to claim 22, wherein the listener router device is implemented as a thin client on an edge device.

26. The method according to claim 22, wherein the listener router device comprises a cable modem termination system (CMTS) in a coaxial network.

27. The method according to claim 22, wherein the listener router device comprises a wide area network (WAN) edge router.

28. The method according to claim 22, wherein the second plurality of local area networks are a plurality of households local area networks.

29. The method according to claim 22, further comprising communicating data received by the listener router device to the internet based server via the CPM server computer.

30. The method according to claim 22, wherein the analyzing the internet data by the gateway computer to determine the data that is latency sensitive and the data that is not latency sensitive comprises sorting the internet data into a plurality of categories, wherein the plurality of categories comprises a latency sensitive category and a not latency sensitive category, wherein the data that is latency sensitive is sorted into the latency sensitive category.

31. The method according to claim 30, further comprising:
   establishing a first criterion of a set of internet data features;
   analyzing the internet data not generated by a user input based on the first criterion; and
   sorting the internet data not generated by the user input into the latency sensitive category, when the internet data not generated by the user input meet the first criterion.

32. The method according to claim 31, wherein the set of internet data features comprises at least one data feature selected from a list consisting of type of internet application, type of data port, destination Internet Protocol (IP) address, quality of service (QOS) classification, type of data packet, bandwidth being used, and packet frequency.

33. The method according to claim 32, further comprising:
   establishing a second criterion;
   analyzing the data that is not latency sensitive, wherein the not latency sensitive category comprises a bandwidth sensitive category and an exclusion category;
   determining whether the data that is not latency sensitive is bandwidth sensitive data based on the second criterion; and
   sorting the bandwidth sensitive data into the bandwidth sensitive category.

34. The method according to claim 33, further comprising:
   sorting a remaining data into a category of exclusion, wherein the remaining data has not been sorted into the latency sensitive category or the bandwidth sensitive category.

35. The method according to claim 34, further comprising:
   routing the data sorted in the bandwidth sensitive category to a second internet route to the internet based server;
   excluding the data sorted in the exclusion category from the first internet route and from the second internet route; and
   transmitting the data sorted in the exclusion category to a third internet route to the internet based server.

36. The method according to claim 22,
   wherein the first internet route is a gamer private network;
   wherein the gamer private network comprises a plurality of computer servers and a plurality of connections between the plurality of computer servers; and
   wherein the plurality of computer servers are distributed.

37. The method according to claim 36, further comprising:
   continuously monitoring a performance of the gamer private network;
   sending a feedback of performance to the gateway computer;
   establishing a performance threshold;

determining whether the performance of the gamer private network is acceptable based on the performance threshold; and modifying server connections within the gamer private network if the performance is not acceptable based on the performance threshold.

38. The method according to claim 22, determining a network quality of service (QOS) based on the network steering data.

39. The method according to claim 38, wherein determining the QOS comprises determining at least one of packet loss, bit rate, throughput, transmission delay, and jitter based the network steering data.

40. The method according to claim 22, further comprising classifying network traffic based on the network steering data.

41. A network system for optimizing internet traffic from a plurality of local area networks (LANs) to an internet based server connected to internet, comprising:

a gateway computer located in a first local area network of the plurality of local area networks, the gateway computer configured to analyze an internet data to determine a data that is latency sensitive and data that is not latency sensitive;

a Central Processing Matrix (CPM) server computer located outside of the plurality of LANs, the CPM server computer being configured to receive network steering data from the gateway computer, the network steering data being based on determining the data that is latency sensitive and the data that is not latency sensitive;

a plurality of customer premises equipment (CPE) located in a second plurality of local area networks in the plurality of LANs to the CPM server computer; and a listener router device located outside of the plurality of LANs and being configured to communicate with the second plurality of local area networks, the CPE being configured to send data through the listener router device located outside of the plurality of LANs, wherein the listener router device is configured to receive the network steering data from the CPM server computer and to route the data that is latency sensitive outside of the second plurality of local area networks to the internet based server based on the network steering data received by the listener router device from the CPM server computer, the network steering data being based on the determination by the gateway computer located in the first local area network of the data that is latency sensitive and the data that is not latency sensitive.

* * * * *